United States Patent Office
3,357,977
Patented Dec. 12, 1967

3,357,977
NOVEL ANTHRANYL INTERMEDIATES
Louis A. Errede, Roseville, Minn., assignor to Minnesota Mining & Manufacturing Company, St. Paul, Minn., a corporation of Delaware
No Drawing. Filed Jan. 6, 1964, Ser. No. 336,033
8 Claims. (Cl. 260—244)

This invention relates to a novel and useful class of polymers and more specifically to polymers having anthranyl groups attached to the main chain of the polymer.

It is an object of the present invention to provide a novel and useful class of polymers. It is another object of the invention to provide a process for the preparation of these polymers. It is another object of the invention to provide certain intermediates of polymers of the invention. It is another object of the invention to provide a process for the preparation of certain intermediates of polymers of the invention. Still other objects will become apparent to those skilled in the art from reading the specification which follows.

The polymers of the invention have saturated carbon-carbon main chains which may or may not also contain recurring ether oxygen atoms therein and recurring side groups thereon selected from hydroxyl groups, groups hydrolyzable to hydroxyl groups and anthranylic groups, at least 5 percent of the total polymer weight being accounted for by anthranylic groups.

A particularly preferred class of polymers of the invention are those having anthranylic side groups of the formula:

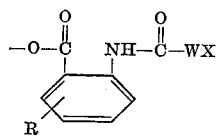

wherein W is a single bond, $(CH_2)_q$,

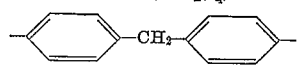

or phenylene; X is $C_mH_{2m+1}$, $C_nF_{2n+1}$, $NH_2$, $NO_2$,

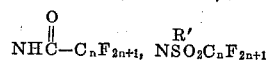

or

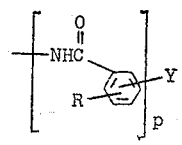

Y is hydrogen or

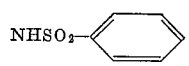

R' is hydrogen or an alkyl group containing up to 6 carbon atoms; R is hydrogen, nitro or halogen; and $m$ is 0–18, $n$ is 1–12, $p$ is 1–20 and $q$ is 1–18, provided that $m+q$ is not greater than 18. The anthranylic side groups in thes polymers appear to render them thermoplastic and to impart thermal stability and additional strength thereto. The anthranylic side groups preferably have molecular weights no greater than about $4 \times 10^3$. In cases where the anthranyl side groups contain perfluoroalkyl radicals, oil and water repellence are also imparted to the polymers. The preferred polymers of the invention comprise from about 10 to 80 weight percent of anthranyl side group.

The preferred polymers of the invention are prepared by inter-reacting an anthranyl having the formula:

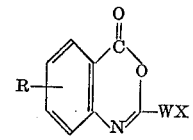

wherein R, W and X are as previously defined, and a polymer having a saturated carbon-carbon main chain which might or might not also contain recurring ether oxygen atoms and containing a plurality of hydroxyl groups or groups of hydrolyzable to hydroxyl groups along its chain and recovering said polymers.

The precursor polymer is contacted with a solution of the anthranyl in a solvent that contains no hydrogen which is reactive toward the anthranyl under the conditions of the reacton. Among the solvents which can be used to dissolve the anthranyls are dimethylformamide, dimethylsulfoxide, pyridine, anhydrous ketones such as acetone and methyl ethyl ketone, etc.

The reaction is preferably carried out at from about 60°–150° C. At temperatures below this range, the reaction is unnecessarily slow while at higher temperatures the reactants often begin to degrade. The reaction time is normally from about 1–10 hours. In some cases a small amount of a alkali metal lower alkoxide (e.g. sodium methoxide, potassium butoxide, etc.) is added to promote the reaction. Anywhere from about .05 to 1.0 mole of the alkoxide, based on the number of reactive groups on the polymer, is ordinarily added to the polymer either before or at the same time it is mixed with the anthranyl.

At the time of its reaction with the anthranyl, the polymer precursor is either dispersed (as a gel or solution) in a solvent of the type used to dissolve the anthranyl (ordinarily the same solvent) or is in solid form (e.g. paper, cloth, etc.). In the former case the polymer precursor itself is usually first dispersed in the solvent and the solution of the anthranyl is then added. The reaction proceeds, a clear, viscous solution being formed. The product is recovered by slow addition of the reaction mixture to an excess of a second liquid in which the solvent but not the solute is soluble. The preferred second liquid is water. The product can then be dried and pressed, molded or spun into useful films, rods or fibers, as desired.

If the precursor polymer is to be maintained in solid form throughout the reaction, it is simply placed in the anthranyl solution to react and is then removed and dried. In this case, the reaction takes place primarily on the surface of the solid object and the use of the alkali metal lower alkoxide is particularly desirable.

Another facet of the invention relates to a class of novel anthranyl compounds which are intermediates in the preparation of certain of the polymers of the invention. These compounds have the formula:

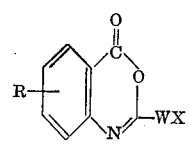

wherein W is a single bond, $(CH_2)_q$, phenylene, or

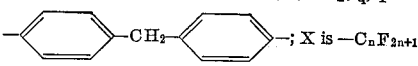

or

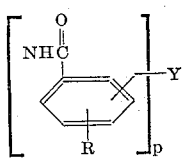

Y is hydrogen or

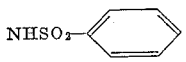

R' is hydrogen or an alkyl group containing up to 6 carbon atoms; R is hydrogen, nitro or halogen; $n$ is 1–12, $p$ is 1–20 and $q$ is 1–18.

Still another facet of the invention relates to the process of preparing o-amido-substituted benzoylanthranyls which comprises reacting an o-amino-benzoic acid with the acyl halide of an organic carboxylic acid having an ionization constant in water of at least about $10^{-1}$. This reaction takes place in the presence of a basic, non-protonic solvent at a temperature in the range of about 100–150° C. The preferred embodiments of this process relate to the preparation of certain of the compounds of the invention as follows:

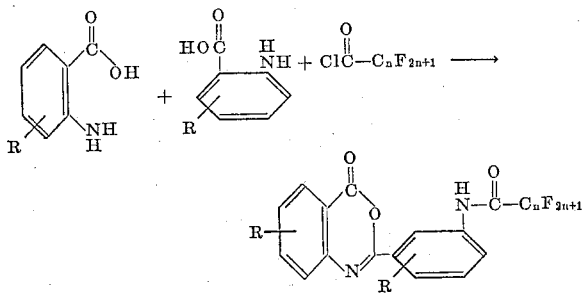

wherein $n$ is as previously defined.

Examples of suitable polymer precursors are polyvinyl alcohol, starch, methocel, cellulose (e.g. cotton cloth, paper, non-woven fabrics), cellulose acetate, hydrolyzed copolymers of vinyl acetate and styrene, copolymers of styrene and allyl alcohol, etc. In addition, polypropylene oxides and polyethylene oxides with terminal hydroxyl groups can be chain extended by the use of bifunctional anthranyls such as adipoylbis-anthranyl, methylene-bis-acetylanthranyl, bis-benzoyl-anthranyl ether, benz, bis-acetylanthranyl, etc. Preformed materials such as polyamides, leather, hides, etc. can also be modified by reaction with acylanthranyls.

Among the anthranyls which are suitable for use in the present invention are: acetylanthranyl, propionylanthranyl, butyrylanthranyl, caproylanthranyl, lauroylanthranyl, palmitoylanthranyl, stearoylanthranyl, 5-bromoacetylanthranyl, 6-nitroacetylanthranyl, perfluoreacetylanthranyl, perfluorooctanoyl-anthranyl, perfluoromyristoylanthranyl, benzoylanthranyl, 6-nitrobenzoylanthranyl, p-nitrobenzoylanthranyl, p-aminobenzoylanthranyl, m-nitrobenzoylanthranyl, o-perfluorooctanamidobenzoylanthranyl, N-ethyl, N-perfluoroöctanesulfonamidoacetylanthranyl, linear - o - benzenesulfonamido - dio - benzamidobenzoylanthranyl, linear-o-benzenesulfonamido-ter-o - benzamidobenzoylanthranyl, linear - o - benzenesulfonamido - deca - o - benzamidobenzoylanthranyl, o - benzamidobenzoylanthranyl, linear di - o - benzamidobenzoylanthranyl, linear tetra - o - benzamidobenzoylanthranyl, linear hepta-o-benzamidobenzoylanthranyl, linear deca-o-benzamidobenzoylanthranyl, 6 - (p - benzamidobenzyl) benzoylanthranyl, etc. The preparations of many of these compounds are given hereinafter. Other anthranyls having structures similar to these illustrative compounds are prepared using analogous processes.

The polymers of the invention of which the precursor polymers are solvent dispersed during their preparation (and which therefore contain a relatively uniform concentration of anthranyl groups throughout) are in general thermoplastic materials which can be pressed or cast into useful films, spun into useful fibers or molded into useful articles. Their properties vary depending upon the nature of the precursor polymer and the anthranylate side groups and with the frequency of occurrence of the latter along the main chain of the polymer. Those polymers having relatively long side chains, e.g. those having repeating units in the side chains, can be considered to be graft co-polymers. The addition of the anthranylate side groups greatly decreases the water sensitivity of the precursor polymer as well as its temperature sensitivity and also tends to stiffen and strengthen it. The solubility of the polymers in various solvents also varies widely, depending on the degree of modification of the precursor polymer by the side chains. The polymers which contain perfluoroalkyl groups have the additional property of being oil and water repellent.

The polymers of the invention of which the precursor polymers remain solid during their preparation have relatively uniform and complete replacement of the hydroxyls and groups hydrolyzable thereto on and near the surfaces of the solid structures by anthranyl groups ordinarily with less complete replacement deeper in the solid structure. Thus the major effects of the anthranyl treatment of such solid structures frequently relate to surface properties such as water and oil repellence as well as some increase in stiffness, strength, heat resistance, etc.

This is not necessarily true, however, since longer treatments, lower viscosity solutions, lower molecular weight anthranyls, and relatively open solid structures, all tend to bring about complete substitution throughout the structure.

In order to more clearly disclose the products of the invention and the processes of their preparation, a number of specific examples will now be given. All parts are by weight unless otherwise designated. For convenience, the anthranyls which appear in the following examples are identified in Table I by structure and by the examples in which they appear. All conform to the following structure:

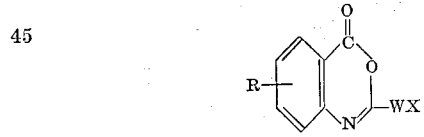

TABLE I

| Ex. No. | R is hydrogen except as follows: | WX [1] |
|---|---|---|
| 1 | | CH₃ |
| 2 | | φ |
| 3 | R is Br | CH₃ |
| 4 | R is NO₂ | CH₃ |
| 5 | R is NO₂ | φ |
| 6 | | —(CH₂)₁CH₃ |
| 7 | | —(CH₂)₁₆CH₃ |
| 8 | | CF₃ |
| 9 | | ![NHC(=O)—(CF₂)₆CF₃ with phenyl] |

See footnotes at end of table.

TABLE I—Continued

| Ex. No. | R is hydrogen except as follows: | WX [1] |
|---|---|---|
| 10 | | —(CF$_2$)$_6$CF$_3$ |
| 11 | | —CH$_2$—N(Et)—SO$_2$(CF$_2$)$_7$CF$_3$ |
| 12 | | 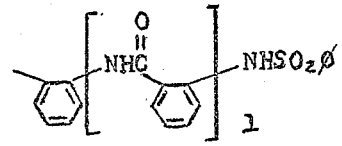 |
| 13 | | s[am]e$_2$ |
| 14 | | s[am]e$_3$ |
| 15 | | 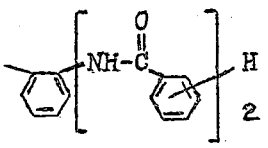 |
| 16 | | 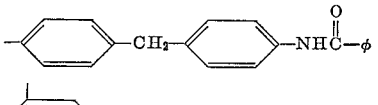 |
| 17 | | s[am]e$_3$ |
| 18 | | s[am]e$_4$ |
| 23 | | s[am]e$_{19}$ [2] |
| 19 | | 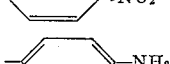 |
| 20 | | 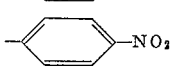 |
| 21 | | —C$_6$H$_4$—NH$_2$ |
| 22 | | 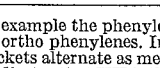 |

[1] In the first lot in this example the phenylene groups inside the brackets alternate as para and ortho phenylenes. In the second lot the phenylene groups inside the brackets alternate as meta and ortho phenylenes.
[2] The symbol s[am]e indicates that WX is the same as that immediately preceding it except that the expression inside the brackets is repeated the number of times indicated.

EXAMPLE 1

*Preparation of acetylanthranyl*

Anthranilic acid (100 g., 0.73 mole) is added to acetic anhydride (500 g.) and the mixture is warmed to reflux temperature. The reaction continues for two hours. About half of the volatiles in the reaction mixture are removed by distillation at atmospheric pressure. (B.P. 125–132°). The rest of the reaction mixture is fractionated by distillation at 9 mm. A large forerun is discarded and the product (101 g., 0.62 mole. 85% yield) boiling at 135° is collected as an oil which solidifies to a white mass which is recrystallized from heptane. The acetylanthranyl is obtained in the form of long white dense needles (M.P. 81–82°). The nuclear magnetic resonance spectrum shows peaks at $\tau=7.58$ for CH$_3$ and a complex peak at $\tau$ 2.03–2.46 for aromatic C—H. Its infrared spectrum is also consistent with the assigned structure.

EXAMPLE 2

*Preparation of benzoylanthranyl*

Benzoyl chloride (140 g.) is added dropwise to a well stirred solution of anthranylic acid (68 g.) in pyridine (240 cc.). The reaction mixture is cooled by means of a cold water bath during the addition of the benzoyl chloride, which requires about 1 hour. Thereafter the temperature is raised to 50–60° for an additional two hours. The reaction mixture is allowed to remain at room temperature overnight to permit slow crystallization, after which it is separated by filtration. The filter cake is washed with water, aqueous NaHCO$_3$ and then water. The product is recrystallized from ethanol to give benzoyl anthranyl in the form of white needles (M.P. 119–120°) which are then recrystallized from acetic anhydride to give the pure compound (M.P. 122–122.5°, lit. 122°).

The infrared spectrum is consistent with the structure of benzoyl anthranyl.

EXAMPLE 3

*Preparation of 5-bromo-acetylanthranyl*

Bromine (47.5 g.) is added dropwise to a solution of anthranylic acid (100 g.) and acetic acid (1250 cc.) kept below 16° C. by external cooling. The product precipitates as the hydrobromide salt and is separated by filtration. The salt is leached three times with 2.5 l. of hot water leaving 3,5-dibromo-anthranylic acid as residue. The hot aqueous extract is concentrated to about 0.5 l. and then cooled to room temperature to give 82 g. of 5-bromoanthranylic acid as white crystals (M.P. 213–217°). The product is allowed to react with 0.5 l. of acetic anhydride for about ½ hour. The solution is cooled to room temperature and 5-bromoacetylanthranyl separated in the form of white crystals (M.P. 129–130°). The infrared spectrum is consistent with the assigned configuration.

EXAMPLE 4

*Preparation of 6-nitro acetylanthranyl*

2-acetamido-5-nitrobenzoic acid (4 g.) is allowed to react at reflux temperature for 5 minutes with acetic anhydride (25 cc.). The solution is cooled to room temperature to give 6-nitro acetylanthranyl in the form of long needles (2.5 g.; M.P. 162.0–162.5). The infrared spectrum is consistent with the assigned configuration.

EXAMPLE 5

*Preparation of 6-nitrobenzoylanthranyl*

2-acetamido-5-nitrobenzoic acid (25 g.) is saponified by reaction at reflux temperature for 6 hrs. in 10% aqueous NaOH (150 cc.). The solution is cooled to room temperature. Crystallization of the sodium salt occurs overnight. The salt is removed by filtration, dissolved in water and the solution is made slightly acidic by addition of dilute HCl to give 2-amino-5-nitrobenzoic acid in the form of a hydrate (14.5 g.; M.P. 275–276°) with one molecule of water for three molecules of the amino nitro acid.

Benzoyl chloride (50 cc.) is added dropwise over a period of 20 minutes to a solution of 2-amino-5-nitrobenzoic acid (9.4 g.) in pyridine (100 cc.) contained in a 500 cc. round bottom flask fitted with a stirrer, a dropping funnel and a reflux condenser. The reaction temperature is kept below 40° by external cooling in a water bath. The reaction solution is added to one liter of water and the resulting precipitate is collected by filtration. The impure 2-benzamido-5-nitrobenzoic acid is converted to the corresponding anthranyl (5.4 g.; M.P. 168–169°) by reaction at reflux temperature for 5 minutes with acetic anhydride. The infrared spectrum of the resulting product is consistent with the assigned configuration.

EXAMPLE 6

*Preparation of propionylanthranyl*

Propionic acid (37 g.) is added dropwise to $PCl_5$ (103 g.) contained in a 500 cc. three necked round bottom flask fitted with a dropping funnel, a stirrer and a reflux condenser. The stirred mixture is cooled in an ice water bath during the addition which requires about 30 minutes. The resulting solution is separated by distillation at atmospheric pressure to give propionyl chloride (35 g., B.P. 80–82°) in 78% yield.

The propionyl chloride is added dropwise to a rotating solution of acetylanthranyl (51 g.) and pyridine (200 cc.) contained in 500 cc. three necked round bottom flask fitted with a dropping funnel, a stirrer and a reflux condenser. The reaction flask is cooled in an ice water bath during the addition which requires about 30 minutes. The reaction mixture is added slowly to cold dilute aqueous HCl (2 l.) contained in a 3 l. beaker. The precipitate is collected by filtration, washed with water and dried to give o-propionamidobenzoic acid (39 g.; M.P. 116–118°) in 54% yield. A small sample is recrystallized from water to give the compound in the form of white crystals (M.P. 118.0–118.5°).

o-(Propionamido)benzoic acid (31 g.) is dissolved in boiling acetic anhydride (150 cc.) The excess solvent is separated by distillation at 1 mm. Hg. The residue is recrystallized from heptane (200 cc.) to give propionylanthranyl in the form of white crystals (21 g., M.P. 84–85°). An additional 3 g. is recovered from the heptane mother liquor by evaporation to dryness to give a total yield of 87%. The infrared spectrum is consistent with the structure of propionylanthranyl.

EXAMPLE 7

*Preparation of stearoylanthranyl*

A mixture of stearic acid (57 g.) and thionylchloride (60 cc.) is allowed to react for one hour at reflux temperature in a 250 cc. round bottom flask. The excess thionylchloride is removed by distillation at atmospheric pressure. The residue is separated by distillation at 1.5 mm. Hg pressure to give stearyl chloride (37 g., B.P. 140–145° and 5 g., B.P. 145–155°) and a brown oily residue (13 g.). The infrared spectrum of the main fraction (M.P. 23°) is consistent with the assigned configuration.

Stearyl chloride (37 g.) is added dropwise to a solution of anthranilic acid (17 g.) and pyridine (150 cc.). The reaction mixture is treated as described in Example 6 to give o-stearamidobenzoic acid (48 g., M.P. 78–80°). A small sample is recrystallized from water to give the compound in the form of white crystals (M.P. 82–83°). The infrared spectrum is consistent with the structure of o-stearamidobenzoic acid.

o-Stearamidobenzoic acid (36 g.) is dissolved in boiling acetic anhydride (150 cc.) and then allowed to recrystallize overnight to give stearylanthranyl in the form of white crystals (27 g., M.P. 45–46° C.). An additional 5 g. (M.P. 42–44°) is recovered from the acetic anhydride mother liquor by evaporation to dryness. The infrared spectrum is consistent with the assigned configuration.

EXAMPLE 8

*Preparation of trifluoroacetylanthranyl*

Trifluoroacetic acid (108 g., 0.95 mole) is added dropwise to $PCl_5$ (208 g.; 1 mole) contained in one liter three necked round bottom flask fitted with a dropping funnel, a stirrer and an overhead condenser. The trifluoroacetyl chloride (0.83 mole, liberated as a gas) is passed through "Drierite" and then collected in a cold trap kept at −78°.

The trifluoroacetylchloride is redistilled slowly by warming the flask to the boiling point at atmospheric pressure and recollected at 0–10° in a stirred solution of anthranilic acid (50 g.; 0.37 mole) and pyridine (300 cc.). The transfer requires about an hour. Reaction is allowed to occur for an additional 15 minutes and then is terminated by addition to water. The precipitate (79 g.) is collected by filtration. The filter cake is extracted twice with hot heptane (150 cc.). The insoluble residue (8.0 g.; M.P. 185–186°) is identified as trifluoroacetylanthranilic acid by its infrared spectrum and analysis.

Calculated for $C_9H_6NO_3F_3$: N, 6.01; neutralization equivalent (N.E.) 233.2. Found: N, 6.1; neutralization equivalent (N.E.) 236.

The heptane extract (300 cc.) is cooled to room temperature and an additional 7.0 g. of impure trifluoroacetylanthranilic acid (M.P. 165–175°) is precipitated from solution. This impure product is separated by filtration and mother liquor is evaporated to dryness. The residue (49 g.; M.P. 51–52°) is identified as trifluoroacetylanthranyl by its infrared spectrum and its analysis:

Calculated for $C_9H_4NO_2F_3$: N, 6.51; N.E. 215.1. Found: N, 6.3; N.E. 218.

Assuming that the free acid was formed by hydrolysis of the anthranyl during the time of contact with water, the yield of trifluoroacetylanthranyl based on anthranilic acid is 82%.

EXAMPLE 9

*Preparation of o-perfluoroöctanamidobenzoylanthranyl*

(A) From the corresponding benzoic acid.—Perfluoroöctanoyl chloride (108 g., 0.25 m.) is added dropwise to a stirred solution of anthranilic acid (70 g., 0.5 m.) in 250 ml. pyridine. The rate of addition is such that reaction temperature does not exceed 30° C. The product which precipitates overnight is recrystallized from $$EtOH-H_2O$$

to give 24.7 g. short, colorless needles; M.P. 207–209° C. Additional product is recovered from the chilled pyridine mother liquor which after single recrystallization weighs 6.5 g., M.P. 196–201° C. The infrared spectrum of the pure material is consistent with the structure of o-(o-perfluoroöctanamido) benzamidobenzoic acid as is the elemental analysis.

Calculated for $C_{22}H_{11}F_{15}N_2O_4$: C, 40.50%; H, 1.70%; N, 4.30%; F, 43.69%; N.E. 326; M.W. 652.33. Found: C, 40.9%; H, 1.9%; N, 4.26%; F, 41.4%; N.E. [1] 329; M.W. 629.

A solution of 25 g. o-(o-perfluoroöctanamido) benzamidobenzoic acid in minimum acetic anhydride is refluxed 3 hours and allowed to stand overnight to bring about crystallization. The product is recrystallized from heptane in short, faintly yellow needles; 21.4 g., M.P. 140–143° C. The infrared spectrum and analysis are consistent for the expected structure.

Calculated for $C_{22}H_9F_{15}N_2O_3$: C, 41.7%; H, 1.42%; N, 4.42%; F, 44.9%; N.E. 634, N.W. 634. Found: C, 41.4%; H, 1.4%; N, 4.18%; F, 40.1%; N.E. 607, M.W. 670.

(B) From perfluoroöctanoyl chloride and anthranilic acid.—Perfluoroöctanoyl chloride (97 g.; 0.23 m.) is added dropwise to a solution of 31 g. (0.22 m.) of anthranilic acid in 200 ml. of pyridine over 0.5 hour. The mixture is heated at reflux for 20 minutes, then allowed to stand until no further precipitate develops. The product is crystallized twice from heptane to give colorless, fine needles; 10 g., M.P. 129–133° C. Further recrystallization does not raise the melting point. The infrared spectrum is identical to that for the anthranyl from route A.

EXAMPLE 10

*Preparation of Perfluoroöctanoylanthranyl*

Perfluoroöctanoyl chloride (5.8 g., 0.013 m.) is added dropwise with stirring to a solution of 3.6 g. (0.026 m.) of anthranilic acid in 30 ml. of acetic acid. The mixture

---

[1] Titrated in pyridine with tetrabutylammonium hydroxide.

is heated at reflux one-half hour to complete the reaction. The product is collected and recrystallized from acetic acid, then heptane to give 2.5 g. fine, colorless needles, M.P. 165–169° C. The infrared spectrum and analysis are consistent with the structure of o-perfluoroöctanamidobenzoic acid.

Calculated for $C_{15}H_6F_{15}NO_3$: C, 33.80%; H, 1.13%; N, 2.63%; F, 53.45%; N.E. 533. Found: C, 33.7%; H, 1.4%; N, 2.6%; F, 52.7%; N.E. 535.

A solution of 1 g. o-perfluoroöctanamidobenzoic acid in 50 ml. of acetic anhydride is refluxed 3 hours. The solution is evaporated to dryness and the crystalline residue (M.P. 78–79° C.) is recrystallized from EtOH. There is recovered 0.5 g. long, colorless needles, M.P. 79–80° C. This anthranyl is highly soluble in acetic anhydride, acetic acid, benzene, chloroform, dichloromethane, diethyl ether, dioxane, and hexane.

Calculated for $C_{15}H_4F_{15}NO_2$: C, 35.0%; H, 0.78%; N, 2.72%; F, 55.4%; N.E. 515. Found: C, 35.5; H, 1.0%; N, 2.7%; F, 54.3%; N.E. 513.

EXAMPLE 11

*Preparation of N-ethyl, N-perfluoroöctanesulfonamidoacetylanthranyl*

N - ethyl - n - perfluoroöctylsulfonamidoacetic acid (50 g.; M.P. 156–157°) and thionyl chloride (125 cc.) are allowed to react at reflux temperature for 2 hours. The excess thionyl chloride is removed by vacuum distillation at 100°. The residue is recrystallized from hexane to give the acyl chloride in the form of tiny white crystals (34 g.; M.P. 65.5–66.5°).

A warm solution of N-ethyl-n-perfluoroöctylsulfonamidoacetyl chloride (26 g.) and toluene (100 cc.) is added dropwise to a refluxing solution of anthranilic acid (23 g.) and toluene (300 cc.) contained in a three necked one liter round bottom flask fitted with a dropping funnel, a stirrer and a reflux condenser. Precipitation occurs throughout the addition which requires about 20 minutes. The reaction mixture is cooled to room temperature and separated by filtration. The mother liquor is evaporated to dryness and anthranalic acid (3.5 g.; M.P. 142–143°) is recovered. The precipitate is digested with hot benzene, cooled to room temperature and then separated by filtration. The benzene mother liquor is evaporated to dryness and an additional 7 g. of anthranilic acid is recovered. The benzene insoluble residue (24 g.; M.P. 184–186°) is recrystallized from hot benzene to give the compound in the form of white crystals (M.P. 185–186°). The infrared spectrum was consistent with the structure of o-(N-ethyl - n - perfluoroocyltsulfonamidoacetamido) - benzoic acid.

A solution of o-(N-ethyl-n-perfluoroöctylsulfonamidoacetamido)-benzoic acid (22 g.) and acetic anhydride (150 cc.) is allowed to react at reflux temperature for 5 minutes. The solvent is separated by vacuum distillation and the residue is recrystallized from heptane to give the corresponding acylanthranyl in the form of white crystals, (M.P. 111–112°). The infrared spectrum is consistent with the structure of N-ethyl-n-perfluorooctylsulfonamidoacetylanthranyl.

A solution of the above anthranyl (4.0 g.), aniline (10 g.) and benzene (50 cc.) is allowed to react at room temperature overnight. The solvent is removed by vacuum distillation. The residue is washed with dilute aqueous HCl and then recrystallized from methanol to give the linear triamide in the form of white crystals (23 g.) that melt at 108–110, resolidify, turn red and then remelt at about 125°. The infrared spectrum is consistent with that anticipated for the structure of the triamide.

EXAMPLE 12

*Preparation of linear o-benzenesulfonamido-o-benzamido-benzoylanthranyl*

Benzenesulfonyl chloride (53 g.) is added dropwise to a rotating solution of anthranylic acid (27 g.) in pyridine (100 cc.). The mixture is warmed to about 100° C. to give a clear solution and then allowed to cool to room temperature. The crystallized product is separated by filtration, washed with hexane, and then recrystallized from acetic acid to give the o-(benzenesulfonamido) benzoylanthranyl in the form of white fluffy needles (M.P. 214–216° C.; 20 g.; 55 percent theory).

Calculated for $C_{20}H_{14}O_4N_2S$: C, 63.48; H, 3.73; N, 7.40; S, 8.47; M.W. 378.41; N.E. 378. Found: C, 63.0; H, 3.9; N, 7.4; S, 8.51; M.W. 382; N.E. 371.

The infrared spectrum is consistent with the assigned configuration.

o-(Benzenesulfonamido) benzoylanthranyl (50 g.; 0.13 mole) and anthranilic acid (23 g.; 0.17 mole) are dissolved in toluene (500 cc.) by heating the mixture to reflux temperature in a three-necked 2 l. round bottom flask fitted with a reflux condenser and a stirrer. Linear o-benzenesulfonamido-di-o-benzamidobenzoic acid begins precipitating from the clear solution within a few minutes after attaining reflux temperature. Eventually the precipitate becomes so voluminous that it is necessary to separate the hot solution by filtration. The filter cake is leached with fresh hot toluene (about 300 cc.) and the extract is added to the original mother liquor. The combined volume is concentrated by rapid evaporation under a stream of nitrogen to the volume indicated in the table below. The reaction is allowed to continue at reflux temperature until a substantial amount of precipitate again forms in the flask. Separation is carried out as described previously. In each case the weight of precipitate linear o-benzenesulfonamido-di-o-benzamidobenzoic acid, melting point and reaction time at reflux temperature is noted. When a significant amount of precipitate no longer forms within a reasonable time interval (5 hrs.) the reaction is terminated. The results are given below.

TABLE II

| Total Run Time (hrs.) | Solution Volume, cc. | Weight Product Isolated in Grams | M.P., ° C. | Total Weight | Total Moles |
|---|---|---|---|---|---|
| 3 | 500 | 11.7 | 222–225 | 11.7 | 0.022 |
| 5 | 450 | 4.0 | 232–233 | 15.7 | 0.030 |
| 7 | 400 | 7.7 | 232–233 | 23.4 | 0.046 |
| 8.5 | 350 | 6.0 | 232–233 | 29.4 | 0.057 |
| 14.5 | 300 | 13.2 | 231–232 | 42.6 | 0.083 |
| 16.5 | 250 | 2.3 | 232–233 | 45.3 | 0.088 |
| 32.5 | 200 | 13.8 | 231–232 | 59.1 | 0.115 |

A sample of the linear o-benzenesulfonamido-di-benzamidobenzoic acid is recrystallized from hot ethanol in the form of pale green platelets (M.P. 235–236°). The compound is identified by its infrared spectrum and by its elementary analysis.

Calculated for $C_{27}H_{21}O_6N_3S$: C, 62.90; H, 4.11; N, 8.15; S, 6.22; N.E. 1st, 515.64; 2nd, 258. Found: C, 63.1; H, 4.0; N, 8.0; S, 6.2; N.E. 1st, 531; 2nd, 262

Linear o-benzenesulfonamido-di-o-benzamidobenzoic acid (60 g.; 0.12 mole) is dissolved in hot acetic anhydride (400 cc.) and reaction is allowed to proceed at reflux temperature for about 10 minutes and then to crystallize overnight. The crystals grow in the form of "puff balls" that eventually fill the flask. The mixture is separated by filtration. The white crystalline product is washed with ether, then with heptane and then recrystallized from benzene to give the desired anthranyl product in the form of fine white needles (41 g.; M.P. 201.5–202.0°). The compound is identified by its infrared spectrum and its elemental analysis.

Calculated for $C_{27}H_{19}O_5N_3S$: N, 8.45; S, 6.44; N.E. 1st, 497.5; 2nd, 284.8. Found: N, 8.15; S, 5.9; N.E. 1st, 507; 2nd, 260.

EXAMPLE 13

*Preparation of linear o-benzenesulfonamido-di-o-benzamidobenzoylanthranyl*

The procedure described in the preceding example is used to prepare 25 g. of linear o-benzenesulfonamido-ter-o-benzamido-benzoic acid (M.P. 236–237° from acetic acid). The mixed melting point with linear-o-benzenesulfonamido-di-o-benzamidobenzoic acid, which also melts at 235–236°, is markedly depressed. The infrared spectrum of the ter-o-benzamido homolog is similar to but not identical with that of the di-o-benzamido homolog.

Linear o-benzenesulfonamido-ter-o-benzamidobenzoic acid (20 g.) is dissolved in refluxing acetic anhydride (2 l.). The solution is cooled to room temperature to give the corresponding anthranyl in the form of tiny pale yellow platelets (3.0 g., M.P. 264–266°). The solution is concentrated to half its volume and a second crop of crystals (4.2 g.; M.P. 267–268°) is obtained. A third crop (1.5 g.; M.P. 264–266°) is obtained by concentrating the mother liquor to about 200 cc.

The compound melting at 267–268° is identified as the anticipated anthranyl with one molecule of acetic acid for every four molecules of anthranyl by its infrared spectrum and its elemental analysis.

Calculated for $(C_{34}H_{24}N_4SO_6)_4 \cdot CH_3CO_2H$: C, 64.65; H, 3.99; N, 8.87; S, 5.08; N.E. 280.8. Found: C, 65.0; H, 4.0; N, 8.7; S, 4.9; N.E. 280.

EXAMPLE 14

*Preperation of linear o-benzenesulfonamido-ter-o-benzamidobenzoylanthranyl*

A solution of linear o-benzenesulfonamido-di-o-benzamidobenzoylanthranyl (7 g.; 0.011 mole; M.P. 267–269°), anthranilic acid (3 g.; 0.022 mole; M.P. 114°) and pyridine (100 cc.) is allowed to react at reflux temperature overnight. The solution is poured into water (1 l.), the resulting precipitate is collected by filtration, dissolved in dilute aqueous base and reprecipitated by acidification with dilute aqueous acid. The product is recrystallized from acetic acid to give linear-o-benzenesulfonamido-o-benzamidobenzoic acid (3.0 g.; M.P. 185–187°).

Linear o-benzenesulfonamido-tetra - o - benzamidobenzoic acid (3.0 g.) is dissolved in refluxing acetic anhydride (1 l.) and the solution is cooled to room temperature to give corresponding anthranyl in the form of white powder. The infrared spectrum of this compound is consistent with that anticipated for linear-o-benzenesulfonamido-ter-o-benzamidobenzoylanthranyl. This assignment is also supported by the elemental analysis.

Calculated for $C_{14}H_{28}O_6N_5S$: S, 4.46; N.E. 1st, 718.8; 2nd, 309.4. Found: S, 4.7; N.E. 1st, 712; 2nd, 282.

EXAMPLE 15

*Preparation of o-benzamidobenzoylanthranyl*

A solution of benzoylanthranyl (82.5 g.; 0.370 mole) anthranilic acid (77 g.) (0.562 mole) and toluene (600 cc.) is allowed to react at reflux temperature to give insoluble linear-di-(o-benzamido)benzoic acid. The precipitate is removed periodically as described in Example 12, each cut is extracted once with fresh toluene. The extract is added to the reaction solution and then concentrated to 600 cc. The results are summarized below:

TABLE III

| Sample | Time (Hrs.) | Total Time | Volume, cc. | Product ||| Total mol. |
|---|---|---|---|---|---|---|---|
| | | | | g. | Moles | M.P. | |
| 1 | 0.5 | 0.5 | 600 | 26.5 | 0.0735 | 221–222 | 0.0735 |
| 2 | 2.5 | 3.0 | 600 | 27.9 | 0.0774 | 224–225 | 0.143 |
| 3 | 2.5 | 5.5 | 600 | 7.1 | 0.0197 | 225–226 | 0.162 |
| 4 | 2.5 | 7.0 | 600 | 9.5 | 0.0235 | 21–226 | 0.189 |
| 5 | 2.5 | 9.5 | 600 | 9.3 | 0.0258 | 15–11 | 0.214 |
| 6 | 2.5 | 12.0 | 600 | 7.3 | 0.0202 | 224–225 | 0.235 |
| 7 | 2.5 | 14.5 | 600 | 5.4 | 0.0150 | 225–226 | 0.250 |
| 8 | 5.0 | | 450 | 18.0 | 0.0499 | 223–224 | 0.300 |
| 9 | 4.0 | | 100 | 15.6 | 0.0433 | 221–223 | 0.343 |

The yield is 93% of theoretical.

The product is recrystallized from acetic acid to give linear-di-o-benzamidobenzoic acid in the form of white crystals (M.P. 225–226°). The infrared spectrum of this product is consistent with the proposed structure. Its elementary analysis is as follows:

Calculated for $C_{21}H_{15}N_2O_4$: C, 69.99; H, 4.48; N, 7.77; N.E. 360.4. Found: C, 70.0; H, 4.6; N, 8.3; N.E. 351.

Impure linear di-o-benzamidobenzoic acid (120 g.; 0.33 mole) (impurity is anthranilic acid) is dissolved in refluxing acetic anhydride (350 cc.) over a period of 5 minutes. The solution is cooled to room temperature to give o-benzamido-benzoylanthranyl in the form of light green crystals (69 g.; M.P. 170–171°).

The infrared spectrum of this material is consistent with the assigned structure. Its elementary analysis is as follows.

Calculated for $C_{21}H_{14}N_2O_3$: C, 73.67; H, 4.12; N, 8.18; N.E. 342.4. Found: C, 73.8; H, 4.2; N, 8.2; N.E. 323.

EXAMPLE 16

*Preparation of linear di-o-benzamidobenzoylanthranyl*

A solution of o-benzamidobenzoylanthranyl (15 g.; 0.044 mole) anthranilic acid (9 g.; 0.066 mole) and toluene (150 cc.) is allowed to react at reflux temperature in a three necked one liter round bottom flask fitted with a stirrer and reflux condenser. The hot reaction mixture is separated by filtration at varionus time intervals. The hot insoluble product is extracted once with refluxing toluene and again separated by filtration. The toluene mother liquors are combined and the solution is reconcentrated under a stream of nitrogen to 600 cc. The results are summarized below.

TABLE IV

| Sample | Time (hrs.) | Vol. (cc.) | Product ||| Total Moles |
|---|---|---|---|---|---|---|
| | | | Wt. (g.) | | M.P. | |
| 1 | 1 | 150 | 6.5 | | 257–258 | 0.016 |
| 2 | 4 | 100 | 6.3 | | 257–258 | 0.027 |
| 3 | 4 | 100 | 16.3 | | 257–258 | 0.034 |
| 4 | 3 | 50 | 20.7 | | 257–258 | 0.043 |

The infrared spectrum is consistent with the structure of linear ter-o-benzamidobenzoic acid. The elementary analysis as follows.

Calculated for $C_{28}H_{21}N_3O_5$: C, 70.14; H, 4.41; N, 8.76; N.E. 1st, 479.5; 2nd, 239.8. Found: C, 70.4; H, 4.9; N, 8.7; N.E. 1st, 479; 2nd, 240.

Linear ter-o-benzamidobenzoic acid (120 g.; 0.25 mole) is dissolved in boiling acetic anhydride (1 l.). The solution is allowed to reflux for 10 minutes and then cooled to room temperature. Linear di-o-benzamidobenzoylanthranyl crystallizes in the form of greenish platelets (107 g.; 0.232 mole; M.P. 225.0–225.5°). The infrared spectrum and the elementary analysis are consistent with the assigned configuration.

Calculated for $C_{28}H_{19}N_3O_4$: C, 72.94; H, 4.15; N, 9.11; N.E. 1st, 461.5; 2nd, 230.8. Found: C, 72.4; H, 4.3; N, 9.1; N.E. 1st, 442; 2nd, 237.

EXAMPLE 17

*Preparation of linear ter-o-benzamidobenzoylanthranyl*

A solution of linear di-o-benzamidobenzoylanthranyl (101.8 g.; 0.221 mole), anthranilic acid (49.5 g.; 0.361 mole) and toluene (1500 cc.) is allowed to react at reflux temperature in a three necked 3 liter round bottom flask fitted with a reflux condenser and stirrer. The reaction is run using the procedure of the preceding examples. The results are tabulated below.

TABLE V

| Sample | Time in Hrs. | | Reaction Volume (cc.) | Product | | |
|---|---|---|---|---|---|---|
| | Time | Total | | Wt. (g.) | Total Moles | M.P.[1] |
| 1 | 2.08 | 2.1 | 1,500 | 16.0 | 0.027 | 247 |
| 2 | 1.42 | 3.5 | 1,500 | 6.1 | 0.037 | 242 |
| 3 | 1.75 | 5.3 | 1,500 | 7.6 | 0.050 | 242 |
| 4 | 2.17 | 7.9 | 1,500 | 4.4 | 0.057 | 242 |
| 5 | 2.75 | 10.7 | 1,500 | 8.9 | 0.072 | 242 |
| 6 | 3.50 | 14.2 | 1,500 | 10.6 | 0.090 | 242 |
| 7 | 5.25 | 19.4 | 1,500 | 11.3 | 0.108 | 242 |
| 8 | 3.50 | 22.9 | 1,500 | 5.7 | 0.118 | 242 |
| 9 | 7.25 | 30.1 | 750 | 20.7 | 0.153 | 242 |
| 10 | 4.50 | 34.6 | 400 | 20.5 | 0.187 | 242 |
| 11 | 4.00 | 38.6 | 150 | 14.7 | 0.211 | 242 |
| 12 | 1.00 | 39.6 | 75 | 2.5 | 0.216 | 242 |
| Residue | | | | 14.8 | | 110–180 |

[1] The compound softens at 242–250° but before melting is complete it rehardens and melts at 314–320°.

The infrared spectrum is consistent with the structure of linear tetra-o-benzamidobenzoic acid. The elementary analysis is as follows:

Calculated for $C_{35}H_{26}N_4O_6$: C, 70.22; H, 4.38; N, 9.36; N.E. 1st, 598.6; 2nd, 299.3. Found: C, 70.5; H, 4.5; N, 9.1; N.E. 1st, 609; 2nd, 252.

Linear tetra-o-benzamidobenzoic acid (122 g.; 0.204 mole) is reacted for 20 minutes at reflux temperature in acetic anhydride (2.5 l.). A clear solution is not obtained, since the product begins precipitating before the starting material has dissolved completely. The mixture is cooled to room temperature overnight and then separated by filtration to give linear ter-o-benzamidobenzoylanthranyl in the form of a white powder (115 g.; 0.197 mole; M.P. 261–262°). The infrared spectrum is consistent with the assigned configuration which is also verified by the elementary analysis. Yield of product is 97%.

Calculated for $C_{35}H_{24}N_4O_5$: C, 72.40; H, 4.17; N, 9.65; N.E. 1st, 580.6; 2nd, 290.3. Found: C, 72.0; H, 4.4; N, 9.6; N.E. 1st, 572, 2nd, 285.

EXAMPLE 18

*Preparation of linear tetra-o-benzamidobenzoylanthranyl*

A mixture of linear ter-o-benzamidobenzoylanthranyl (0.026 mole), anthranilic acid (0.053 mole) and p-xylene (750 cc.) is allowed to react at reflux temperature for 24 hrs. in a 2 l. round bottom flask fitted with a stirrer and reflux condenser. A clear solution is not obtained. The insoluble acid product is separated by filtration and then extracted with boiling acetic acid to give linear penta-o-benzamidobenzoic acid as a white powder (8.5 g.; 0.018 mole; M.P. 320–330°). The infrared spectrum is consistent with that anticipated for the linear polyamido acid.

Tetra-o-benzamidobenzoylanthranyl is prepared by reacting penta-o-benzamidobenzoic acid with benzoyl chloride under reaction conditions similar to those in Example 2.

By repeating this sequence of reactions (i.e. reacting the newly formed benzamidobenzoylanthranyl with anthranylic acid to form the linear-o-benzamidobenzoic acid product and then reacting that product with benzoyl chloride to form the next longer benzamidobenzoylanthranyl), any desired number of

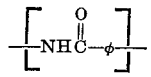

groups (up to ten or more total) can be imparted to the anthranyl.

EXAMPLE 19

*Preparation of 6-(p-benzamidobenzyl)benzoylanthranyl*

Benzoyl chloride (122 g.) is added dropwise to a solution of impure di-(4-aminophenyl) methane-3,3'-dicarboxylic acid (M.P. 225–230°; 62 g.) in pyridine (1 l.) cooled in an ice bath. The foregoing diamino dicarboxylic acid is prepared according to the directions of Heller and Fiesselman (Ann. 324 118 (1902)). A precipitate separates during the addition which requires about 30 minutes. The mixture is separated by filtration, washed sequentially with water, aqueous sodium bicarbonate and again with water. The dry filter cake (60 g.) (M.P. 291–294°) is recrystallized from N,N-dimethylformamide to give methylene-bis-benzoylanthranyl in the form of white crystals (M.P. 297–298°; 20 g.).

The infrared spectrum is consistent with the expected compound.

Calculated for $C_{29}H_{20}O_4N_2$: C, 75.97; H, 3.96; N, 6.11; M.W. 458.48. Found: C, 75.4; H, 4.0; N, 6.3.

The dimethylformamide mother liquor is diluted with water and the insoluble material is separated by filtration. The filter cake is recrystallized from paraxylene and the product is obtained as a white powder 6 g. melting point 240–242. The infrared spectrum and elementary analysis of this compound are consistent with the structure of 6-(p-benzoamidobenzyl) benzoylanthranyl.

Calculated for $C_{28}H_{20}N_2O_3$: C, 77.76; H, 4.66; N, 6.48; M.W. 432.5. Found: C, 77.7; H, 4.7; N, 6.7; M.W. 453.

EXAMPLE 20

*Preparation of p-nitrobenzoylanthranyl*

Anthranilic acid (68.5 g., 0.5 m.) is dissolved in 500 ml. water containing 20 g. (0.5 m.) NaOH. To the stirred solution is added over a period of 15 minutes a mixture of 93 g. (0.5 m.) p-nitrobenzoyl chloride in 500 ml. absolute ether. The reaction is of sufficient vigor to evaporate most of the ether. Stirring is continued 3 hours. The product, purified by two crystallizations from ethanol, is recovered as small yellow crystals, M.P. 234–235° C. The infrared spectrum is consistent with the proposed structure, i.e. o-(p-nitrobenzamido)benzoic acid.

The crude o-(p-nitrobenzamido)benzoic acid is refluxed in 1000 ml. of acetic anhydride for 24 hours. The product, recovered from the cold solution is recrystallized from acetic anhydride to give 106 g. (79% yield) of p-nitrobenzoylanthranyl as small, faintly yellow needles, M.P. 208–210.

EXAMPLE 21

*Preparation of p-aminobenzoylanthranyl*

(A) Via p-nitrobenzoylanthranyl.—A 1 liter autoclave containing 20 g. p-nitrobenzoylanthranyl, 500 ml. dioxane, and 5 g. Raney Ni catalyst is charged to 400 p.s.i. with hydrogen. The stirred reaction mixture is heated to 80° C. (mild exotherm) over a period of 1.5 hours and then allowed to cool. The solution is filtered, then dried at 10 mm. by distillation through a short Vigreaux column with a wax bath at 60° C. The yellow residue recrystallized from benzene gives 12.5 g. (70% yield) of p-aminobenzoylanthranyl as small yellow needles. The product melts at 226–227° C. to a light red liquid. Brief heating at the melting point gives resolidification to a nearly colorless mass which does not melt below 400° C. The infrared spectrum is consistent with the proposed structure. The elemental analysis is as follows:

Calculated for $C_{14}H_{10}N_2O_2$: C, 70.57; H, 4.23; N, 11.76; M.W. 238.2. Found: C, 70.2; H, 4.3; N, 11.8; M.W. 239.

(B) *Via* o-(p-aminobenzamido)benzoic acid.—A stirred mixture of 20 g. o-(p-nitrobenzamido)benzoic acid in 800 ml. absolute ethanol with 5 g. Raney Ni is placed in a pressure vessel which is charged to 600 p.s.i. with hydrogen then maintained at 80° C. for 1 hour. The vessel is a 1 l. autoclave fitted for stirring. The solution is filtered, reduced in volume to 500 ml. Hot water is added to the boiling solution until the first appearance of a precipitate. The solution is then cooled to room temperature. There is recovered 16 g. (89%) o-(p-aminobenzamido)benzoic acid as long, colorless, silky needles. The product, recrystallized from ethanol-water, melts at 220–221° C. with decomposition. N.E. calculated, 256; N.E. found, 258.

A slurry of 5 g. o-(p-aminobenzamido)benzoic acid in 40 ml. benzene is treated with 5 g. thionyl chloride and the mixture is warmed at 60–70° C. for 3 hours. The solid is collected from the cold mixture and washed with petroleum ether to give 5 g. of p-aminobenzoylanthranyl hydrochloride; darkened 300° C., M.P. 360° C. The mixture of this hydrochloride in 40 ml. water is made alkaline with dilute NaOH to give a yellow powder which is washed thoroughly with water. Recrystallization from EtOH gives 3 g. p-aminobenzoylanthranyl as small yellow needles which melt at 222–224° C. and resolidify. The melting point and resolidification behavior of this material mixed with the anthranyl prepared in procedure A are unchanged. The infrared spectrum is identical to that of the anthranyl of procedure A above.

EXAMPLE 22

*Preparation of m-nitrobenzoylanthranyl*

To a slowly stirred solution of 115 g. (0.84 m.) anthranilic acid in 1 l. water which contains 34 g. (0.84 m.) NaOH is added cautiously in portions a solution of 140 g. (0.84 m.) of crude m-nitrobenzoyl chloride in 200 ml. of absolute ether. After most of the ether has evaporated as a result of the exotherm of reaction, the solution is stirred vigorously for 2 hours. The mixture is warmed on the steam bath with continued stirring for an additional hour to complete the reaction and drive off residual ether. The product is collected and dried to give 215 g. of crude o-(m-nitrobenzamido)benzoic acid.

The crude acid (107 g.) is then boiled in 1 l. of acetic anhydride for 3 hours, the solution filtered hot to remove traces of insolubles, and the filtrate reduced to half volume.

A solution of m-nitrobenzoylchloride (149 g.; 0.84 mole) in absolute ether (200 cc.) is added dropwise at room temperature to a rotating solution of anthranilic acid (115 g.; 0.84 mole) and sodium hydroxide (34 g.; 0.84 mole) in water (one liter) contained in a three necked 2 liter round bottom flask fitted with a reflux condenser, dropping funnel and stirrer. Most of the ether is removed by evaporation and the resulting mixture is allowed to react at about 100° C. for an additional hour. The mixture is separated by filtration to give crude o-(m-nitrobenzamido)benzoic acid (215 g.).

This product is made to react with boiling acetic anhydride (2 liters) for 3 hours. The hot solution is filtered and the filtrate is concentrated at reflux temperature to one liter volume. The solution is allowed to cool to room temperature to give m-nitrobenzoylanthranyl in the form of an off-white powder (M.P. 169–170°; 156 g.; yield 93%).

EXAMPLE 23

*Telomerization of p-aminobenzoylanthranyl with benzoic anhydride* p-Aminobenzoylanthranyl (24.0 g.; 0.1 mole) and benzoic anhydride (2.3 g.; 0.01 mole) are melted together and made to react at 220° for 10 min. in a one necked 100 ml. round bottom flask fitted with a stirrer and a nitrogen inlet. The melt begins to resolidify after the temperature reaches 240°. Reaction is continued without stirring for an additional 10 minutes. The telomeric product is dissolved in N-methylpyrrolidinone and reprecipitated by dropwise addition of this solution to water. The purified product is dried at 60° in a vacuum oven. The amber telomeric product is isolated in 94% yield (24.6 g.). It does not melt below 330° C. The infrared spectrum of this material indicates that all the amine groups have been converted to amide groups and that anthranyl groups are present at the end of the chain. The molecular weight of this telomer is about $2 \times 10^3$. These results indicate that the telomeric structure is essentially that as shown below:

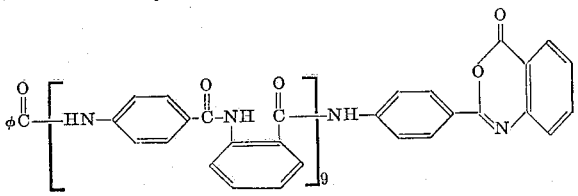

Similar results are obtained in the telomerization of m-aminobenzoylanthranyl.

EXAMPLE 24

*Reaction of acetylanthranyl and polyvinyl alcohol*

10 grams of high viscosity polyvinyl alcohol (Elvanol 72–51, more fully described hereinafter), 30 grams of acetylanthranyl and 250 cc. of N,N'-dimethylformamide are stirred together at 100–110° C., a homogeneous viscous solution being formed within approximately 10 minutes of reaching the reaction temperature. The solution is maintained at this temperature for approximately one hour, during which time the agitation is continued, and is then poured with vigorous agitation into a large excess of water. The solution forms a plastic precipitate which is allowed to settle and the aqueous layer is removed by decantation. The precipitate is then leached with hot aqueous sodium bicarbonate, the residue is collected by filtration, reslurried in water and the water is again removed by decantation. The wet polymer is added to an equal volume of acetone to form a clear, water white solution which is a thermolabile jel which is fluid at the boiling point of acetone and which is a solid gum at room temperature. Addition of more acetone causes the hot solution to coagulate but solution again occurs on evaporation of the acetone to the critical range for the ternary solution. The polymer is reprecipitated by dropwise addition of the hot viscous solution to a large excess of water. The resulting plastic precipitate gradually disintegrates to small particles by continued agitation in the water. These particles are allowed to settle over night, the supernatant water is separated by decantation and the remaining mass is squeezed dry then dried over night in a vaccum oven at 90° C. to yield 10 grams of polymer. The elementary analysis for nitrogen corresponds to a ratio of vinyl alcohol to acetylanthranyl units of 7.3 to 1 indicating that the average repeating unit is approximately as follows:

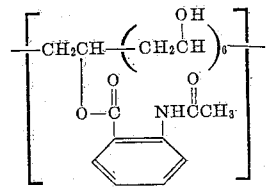

This conclusion is supported by the infrared spectrum of the sample.

This polymer is pressed into a clear white tough pliable film at a temperature of 200° C. and a ram pressure of 20,000 p.s.i. The tensile strength of this film is found to be $1.2 \times 10^4$ p.s.i., its tensile modulus 2.92 and its percent elongation at rupture 5–20 percent. The X-ray diffraction pattern of the precursor polyvinyl alcohol shows it to be a crystalline material while the polymer of this example is shown by the X-ray diffraction pattern to be non-crystalline.

In another preparation, 200 cc. of dimethylformamide, 20 grams of polyvinyl alcohol ("Elvanol" 72–51) and 2 grams of sodium methoxide are charged to a 500 milliliter three-necked round bottom reaction flask fitted with a stirrer, a nitrogen inlet tube, a dropping funnel and a thermometer. The mixture is warmed to 280° C. with stirring and maintained at that temperature for ½ hour during which time nitrogen is swept through the flask to eliminate methyl alcohol. 20 grams of acetylanthranyl dissolved in 50 cc. of dimethylformamide are then added dropwise to the rotating stirred suspension of polyvinyl alcohol in dimethylformamide over a period of about one hour. Swelling of the polyvinyl alcohol begins with the first addition of acetylanthranyl and solution is virtually complete before the last of the acetylanthranyl is added. The reaction mixture is maintained at 80° C. for two additional hours and then allowed to cool to about 25° C. and remain for approximately 17 hours without stirring. At the end of this time a small amount of insoluble polyvinyl alcohol is decanted from the mixture and the remaining clear solution is poured dropwise into two liters of continuously agitated water. The polymer precipitates as a white fibrous rather sticky material that gradually loses its tacky feel with continued washing in the water. The polymer is leached with warm aqueous sodium bicarbonate and warm water, is dissolved in a solution of approximately 360 cc. of acetone and 40 cc. of water and finally is reprecipitated by the dropwise addition of two liters of water. The product is isolated by filtration, dried and weighed, a 31 gram sample being recovered (78 percent of the theoretical yield). This polymer contains 4.3 percent of nitrogen which corresponds to a ratio of vinyl alcohol units to acetylanthranyl side change units of 3.7 to 1 which is the exact ratio of these products charged to the reaction mixture.

The polymer is ground to 20 mesh particles and 1 gram samples are then pressed at about 200° C. and 10 ton total ram pressure into water white, pliable films. The tensile strength of films cut from the resulting film is found to be 14,900 lbs. per square inch with a 14 percent elongation at break. Narrow strips are also cut from these films and oriented by hand drawing to give tough fibers with tensile strengths of 20–30×10³ p.s.i.

A sample of the polymer is heat molded into a 1″ plug which is then drilled, tapped and machined in a lathe to produce a cylinder about ½″ in diameter and ¾″ in length thus demonstrating the machineability of the product.

The polymeric product is also extruded to give fibers with strengths comparable to those of the films.

Unmodified polyvinyl alcohol cannot be pressed into films as above, the result being merely to char the polymer.

A number of samples of reaction products of acetylanthranyl and polyvinyl alcohol are prepared in which the type of polyvinyl alcohol used is modified as well as the charge ratio of the polyvinyl alcohol to acetylanthranyl. Three grades of white, powdered polyvinyl alcohol are used: high viscosity "Elvanol" 72–51, medium viscosity "Elvanol" 71–24 and low viscosity "Elvanol" 70–05, all available from E. I. du Pont de Nemours and Co., Inc. The various preparations are summarized in Table VI. The procedure for the preparation of each of these lots is approximately the same as the polymerization procedure just described.

TABLE VI

| Lot Designation | Viscosity Type PVA | Charge Ratio PVA/AA [d] | Percent Yield of Product | Percent Nitrogen in Product | Ratio of PVA/AA in Product [d] | ($\eta$) |
|---|---|---|---|---|---|---|
| A | Low [a] | 3.7/1 | | 3.9 | 5/1 | 1.2 |
| B | Low [a] | 3.7/1 | 80 | 4.0 | 4.3/1 | 0.47 |
| C | Medium [a] | 3.7/1 | 85 | 4.0 | 4.3/1 | |
| D | do.[b] | 3.7/1 | 95 | 4.2 | 3.9/1 | |
| E | do.[b] | 7.4/1 | 66 | 1.7 | 15/1 | 1.64 |
| F | do.[b] | 10/1 | 65 | 1.4 | 18/1 | |
| G | do.[b] | 15/1 | 59 | | | |
| H | High [a] | 0.92/1 | 70 | 6.9 | 1/1 | 0.79 |
| I | do.[b] | 3.7/1 | 95 | 4.3 / 4.1 | 3.8/1 / 4.1/1 | 1.3 |
| J | do.[b] [c] | 3.7/1 | 79 | 3.5 | | |
| K | do.[b] | 7.4/1 | 81 | 2.3 | 10/1 | 1.8 |
| L | do.[b] | 10/1 | 56 | 1.4 | 18/1 | 2.1 |
| M | do.[b] | 15/1 | 57 | 0.6 | 49/1 | |

[a] 10 grams of PVA used.
[b] 200 grams of PVA used.
[c] Dimethylsulfoxide solvent used in place of dimethylformamide.
[d] Mole ratio of polyvinyl alcohol to acetylanthranyl units.

It is noted that the solubility of these polymeric products in dimethylformamide increases with the increase in degree of acylation with acetylanthranyl. Thus, 200 grams of a product having a PVA to AA ratio of about 12/1 requires 24 hours to dissolve completely in 4 liters of dimethylformamide at 120° C. while 300 grams of a product with a PVA to AA ratio of about 4/1 dissolves completely within four hours in 2 liters of dimethylformamide at 80° C. Similarly, the sensitivity to water of the polymer decreases with the increase of the degree of acylation. Thus, a polymer with a PVA to AA ratio of about 4/1 precipitates as a fibrous material when injected as a 2 percent solution of polymer in dimethylformamide into a stream of water whereas the 12/1 product can only be recovered as a soft plastic mass by leaching out the dimethylformamide solvent with water.

Film samples are pressed from various of the above lots of polymers and evaluated as summarized in Table VII.

TABLE VII

| Lot Designation | Elastic Modulus (10⁵ p.s.i.) | Tensile (10³ p.s.i.) After Heat Elongation | Percent Elongation at Break |
|---|---|---|---|
| A | 2.5 | 11.1 | 30 |
| C | [a] 2.1 | 9.1 | 10 |
| D | 2.4 | 9.9 | 20 |
| E | 3.3 | 22.7 | 20 |
| F | 3.9 | [b] 24.2 | 20 |
| H | 2.0 | 8.3 | 10 |
| I | 2.3 / 2.6 | 9.0 / 12.7 | 20 / 20 |
| J | 3.6 | 15.6 | 20 |
| K | 3.1 | 17.1 | 15 |
| L | 3.6 | [b] 26.1 | 20 |
| M | 3.6 | 17/1 | 30 |

[a] X-ray diffraction patterns indicate that pressed sample and heat oriented film therefrom are both amorphous.
[b] Sample rupture at jaw indicating that breaks started by mechanical cutting. X-ray diffraction indicates that these products are crystalline.

X-ray diffraction tests on these samples indicate that amorphous film strips having a PVA to AA ratio of about 18/1 become crystalline upon heat elongation while the same treatment has no such observable effect on polymers having a PVA/AA ratio of 4/1. In all cases, however, the flexibility and pliability of the polymer are moderately improved after heat elongation. The effect of such heat elongation on several of the lots of the foregoing tables is summarized in Table VIII.

TABLE VIII

| Lot Designation | PVA Viscosity | PVA/AA Ratio | Tensile Strength ($10^3$ p.s.i.) | |
|---|---|---|---|---|
| | | | Before Orientation | After Orientation |
| E | Medium | 15/1 | 9.7 | 22.7 |
| F | do | 18/1 | 10.7 | 24.2 |
| K | High | 10/1 | 9.0 | 17.1 |
| L | do | 18/1 | 9.8 | 26.1 |

EXAMPLE 25

*Reaction of benzoylanthranyl with polyvinyl alcohol*

50 grams of polyvinyl alcohol (Elvanol 72–51), and 8 grams of sodium methylate are slurried in 450 cc. of dimethylformamide contained in a 1 liter three necked flask fitted with a stirrer, a dropping funnel, a reflux condenser and a thermometer. The stirred slurry is warmed to 60° C. and a solution of 34 grams of benzoylanthranyl in 300 cc. of dimethylformamide is added dropwise. The mixture is heated to 120° C. and is allowed to react at that temperature for an additional 8 hours, the agitation being continued. The resulting homogeneous slightly green but clear solution is precipitated by pouring it into a 10 fold excess of cold water. The precipitate is collected by filtration, washed with water, with aqueous sodium bicarbonate and then again with fresh water. The product is dried ground to 20 mesh particle size. The yield is 89 percent of the theoretical amount (57 grams). It is found to contain 1.3 percent of nitrogen corresponding to a ratio of PVA to benzoylanthranyl units of 19/1.

This polymeric product is pressed at 400° F. and 25,000 p.s.i. ram pressure for 1 minute to give a clear, transparent, pliable film. The tensile strength of this film is 10,700 lbs. per square inch and the tensile is raised to 23,100 lbs. per square inch by heat orientation. The elastic modulus of the oriented film is $6.1 \times 10^5$ p.s.i. and the percent elongation at break is 10.

The characteristics of several other polymers produced by the reaction of the three grades of polyvinyl alcohol ("Elvanol" 72–51, 71–24 and 70–05) with benzoylanthranyl are summarized in Table IX, the ratio of polyvinyl alcohol to benzoylanthranyl units being on a molar basis.

TABLE IX

| Viscosity type PVA | Ratio PVA/BA in Prod. | Elastic Modulus ($10^5$ p.s.i.) | Tensile ($10^3$ p.s.i.) After Heat Elongation | Percent Elong. |
|---|---|---|---|---|
| High | 5/1 | 2.0 | 9.73 | 43 |
| High | 10/1 | 2.7 | 24.0 | 40 |
| High | 19/1 | 4.2 | 26.4 | 20 |
| Low | 5/1 | 2.3 | 8.05 | 6 |
| Low | 15/1 | 2.5 | 6.2 | 8 |
| Low | 25/1 | 2.8 | 8.04 | 7 |
| Med | | 1.9 | 8.43 | 15 |

EXAMPLE 26

*Reaction of acetylanthranyl with cellulose acetates*

One gram of acetylanthranyl in 1 cc. of pyridine is added to 20 cc. of a 10 percent cellulose acetate solution in acetone contained in 50 cc. Erlenmeyer flask. The cellulose acetate used in preparing the foregoing solution is a high molecular weight film material. This solution is allowed to remain at room temperature for two days. At the end of this time the solution is placed on a steam bath and the acetone is removed by evaporation. After bubble formation has ceased, the viscous residue is redissolved in 20 cc. of acetone and the resulting solution is added dropwise to 400 cc. of water with continuous agitation. This product precipitates in the water as a very fine fibrous material which resembles cotton or glass-wool dispersed in water. Samples of this dispersion are separated by filtration to obtain continuous sheets of non-woven fabric material resembling paper. By contrast, unmodified cellulose acetate is obtained simply as a taffy-like mass when reprecipitated under the same conditions. Elementary analysis of this polymeric product indicates a 1.4 percent nitrogen content. The infrared spectrum of the polymer indicates the presence of acetylanthranyl groups in the cellulose acetate.

EXAMPLE 27

*Reaction of benzoylanthranyl with cellulose acetate*

A solution of benzoylanthranyl (10 g.) in acetone (50 cc.) is added dropwise to a rotating mixture of cellulose acetate (20 g.) pyridine (20 cc.), $NaOCH_3$ (2 g.) and acetone (200 cc.) contained in a 500 cc. three necked round bottom flask fitted with a stirrer, dropping funnel, thermometer and reflux condenser. The reaction is carried out at reflux temperature for 8 hours while protected from oxygen by an atmosphere of nitrogen. A clear solution is obtained. The product is recovered in 90% yield by dropwise addition to large excess of water and is then leached with aqueous $NaHCO_3$ and again with water and air dried.

The polymer is pressed at 200° C. and 2000 lbs. ram pressure into tough, flexible films that can be heat oriented to give crystalline flexible films with tensile strengths in excess of $2.5 \times 10^4$ p.s.i. Films are also cast from solution. Rods and other large objects are prepared by injection molding. These speciments can be drilled and tapped, and machine shaped on a lathe.

EXAMPLE 28

*Reactions of o-perfluoroöctanamidobenzoylanthranyl, perfluoroöctanoylanthranyl and N-ethyl-n-perfluoroöctylsulfonamidoacetylanthranyl with cotton cloth and paper*

The cloth and paper are first boiled briefly in a solution of sodium methoxide in methyl alcohol and are then treated in a solution of the anthranyl in benzene. The lots are as follows:

TABLE X

| Lot | Anthranyl WX= | Polymer |
|---|---|---|
| A | ⌬–NHCOC$_7$F$_{15}$ | Cotton cloth. |
| B | ⌬–NHCOC$_7$F$_{15}$ | Filter paper. |
| C | —C$_7$F$_{15}$ | Cotton cloth. |
| D | —CH$_2$NEtSO$_2$C$_8$F$_{17}$ | Do. |

The resulting treated cloth and paper are found to repel water. The treated samples of lots A and C are further tested by agitating them in a washing machine in hot water. They are found to retain their water repellency through this cycle.

EXAMPLE 29

*Reaction of longer chain polybenzamidobenzoylanthranyls with polyvinyl alcohol*

A mixture of N-methylpyrrolidinone (35 cc.), polyvinyl alcohol (1 g.) and sodium methoxide (0.1 g.) is allowed to react at 60° for 1 hour in a 100 cc. round bottom flask fitted with a stirrer and a nitrogen sweep. The telomeric product (1 g.) of p-aminobenzoylanthranyl and benzoic anhydride of Example 23 in N-methylpyrrolidinone (35 cc.) is added to this mixture and reaction is allowed to occur overnight at 80–100° C. to afford a homogeneous viscous solution. The modified polyvinyl alcohol is precipitated by dropwise addition to water. The product is isolated in 90% of theory. The infrared spectrum of this material confirms that esterification has occurred to give the expected modified polyvinyl alcohol with pendant polyamide chains.

Similar results are obtained when polyvinyl alcohol is modified by reaction with the corresponding telomer of m-aminobenzoylanthranyl and benzoic anhydride.

A solution of linear-poly-o-benzamido benzoylanthranyl (5 g.; average molecular weight =1400 which corresponds to about 10 benzamido units) in dimethyl sulfoxide (50 cc.) is added dropwise to a rotating mixture of polyvinyl alcohol (25 g.), NaOCH$_3$ (3 g.) and dimethyl sulfoxide (200 cc.) contained in a 500 cc. three necked round bottom flask fitted with a stirrer, dropping funnel, thermometer and reflux condenser. The reaction is carried out at 100° C. for 8 hours while protected from oxygen by an atmosphere of nitrogen. A clear solution is obtained. The product is recovered in 85% yield by dropwise addition to large excess of water. The product is leached with aqueous NaHCO$_3$ and again with water and air dried.

The polymer is pressed at 200° C. and 2000 lbs. ram pressure into tough flexible films that can be heat oriented to give crystalline flexible films with tensile strengths in excess of 2.5×10$^4$ p.s.i. Films are also cast from solution. Rods and other large objects ar prepared by injection molding. These specimens can be drilled and tapped, and machine shaped on a lathe.

In another lot, a weight ratio of the polyvinyl alcohol to the same anthranyl of 10/1 is used. The procedure is repeated except that the solvent is removed by vacuum distillation. The residue is extracted with hot water. The aqueous solution of the product, weight ratio 20/1, is a high temperature gel that is liquid at about 100° C. but solid at about 80° C. This product can be used in a microbe-resistant photographic emulsion.

Table XI summarizes a number of examples relating to the preparation of polymers of the invention from polyvinyl alcohol and a number of anthranyls. In each case a solution of the anthranyl in 50 cc. of a solvent (either dimethyl formamide or dimethylsulfoxide) is added dropwise to a stirred mixture of polyvinyl alcohol, sodium methoxide and 200 cc. of the same solvent in a 500 cc. three necked round bottom flask fitted with a stirrer, a dropping funnel, a thermometer and a reflux condenser. The times and temperatures of the reactions are indicated in the table. In each case the mixture is stirred during the reaction, which is carried out in an atmosphere of nitrogen. "Elvanol" 71–24 is the polyvinyl alcohol used in these examples.

Clear solutions of the polymeric products are obtained in each case. They are recovered by dropwise addition of this solution to a large excess of water, leaching the resulting coagulated polymers with aqueous sodium bicarbonate and water and then air drying them.

Each of the resulting polymers is pressed at 200° C. and 2000 lbs. ram pressure into a tough, flexible film that can be heat oriented to give crystalline flexible films with tensile strengths in excess of 2.5×10$^4$ p.s.i. Films are also cast from solution. Rods and other large objects of these polymers can be prepared by injection molding, and these objects can be drilled and tapped, and machine shaped on a lathe.

TABLE XI

| Example Number | Anthranyl | | PVA (gms.) | NaOCH$_3$ (gms.) | Solvent | Reaction | | Yield, Percent |
|---|---|---|---|---|---|---|---|---|
| | Cpd. of Example Number | Amount (gms.) | | | | Time (hrs.) | Temp., °C. | |
| 30 | 3 | 10 | 50 | 2 | DMF | 8 | 100 | 95 |
| 31 | 4 | 10 | 20 | 2 | DMF | 6 | 100 | 90 |
| 32 | 5 | 10 | 20 | 2 | DMS | 8 | 80 | 90 |
| 33 | 6 | 10 | 20 | 2 | DMS | 8 | 80 | 95 |
| 34 | 7 | 15 | 20 | 2 | DMF | 6 | 110 | 92 |
| 35 | 8 | 20 | 20 | 2 | DMS | 5 | 90 | [1] 95 |
| 36 | 9 | 10 | 20 | 2 | DMS | 6 | 90 | 90 |
| 37 | 10 | 10 | 20 | 2 | DMF | 8 | 110 | [2] 92 |
| 38 | 11 | 10 | 25 | 2 | DMF | 8 | 110 | [2] 95 |
| 39 | 12 | 10 | 25 | 4 | DMS | 6 | 90 | 88 |
| 40 | 13 | 10 | 25 | 4 | DMS | 6 | 90 | 90 |
| 41 | 14 | 10 | 25 | 4 | DMS | 7 | 90 | 90 |
| 42 | 15 | 10 | 20 | 2 | DMF | 7 | 110 | 90 |
| 43 | 16 | 5 | 25 | 2 | DMS | 6 | 90 | 90 |
| 44 | 17 | 5 | 25 | 2 | DMF | 8 | 110 | 85 |
| 45 | 19 | 5 | 20 | 2 | DMF | 6 | 110 | 85 |
| 46 | 21 | 10 | 20 | 2 | DMS | [3] 8 | 100 | 90 |

[1] Extruded specimens made from this polymer resist wetting by water despite a large excess of free OH radicals therein.
[2] Extruded specimens are resistant to wetting by water.
[3] Two reactions occur simultaneously: the homopolymerization of p-aminobenzoylanthranyl and esterification of the polyvinyl alcohol. The final product is polyvinyl alcohol with side chains of polybenzamido groups.

What is claimed is:
1. A compound of the formula:

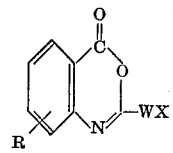

wherein W is (CH$_2$)$_q$

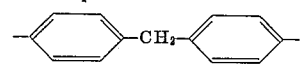

or phenylene; X is —C$_n$F$_{2n+1}$,

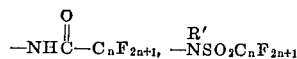

or

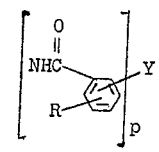

Y is hydrogen or

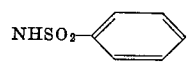

R' is hydrogen or an alkyl group containing up to 6 carbon atoms; R is hydrogen, nitro or halogen, $q$ is 1–18, $n$ is 1–12 and $p$ is 1–20.

2. A compound of the formula:

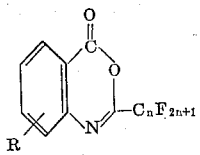

wherein R is hydrogen, nitro or halogen and $n$ is 1–12.

3. A compound according to claim 1 wherein X is

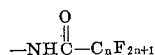

4. A compound according to claim 1 wherein X is

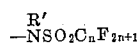

5. A compound according to claim 1 wherein X is

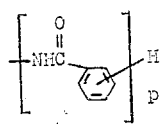

6. A compound according to claim 1 wherein X is

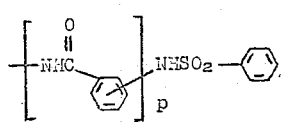

7. The process of preparing an o-amido-substituted benzoylanthranyl which comprises reacting 2 moles of an o-amino-benzoic acid with the acyl halide of an organic carboxylic acid having an ionization constant in water of at least about $10^{-1}$ in the presence of a basic, non-protonic solvent and at a temperature in the range of about 100–150° C., and recovering the desired o-amido-substituted benzoyl anthranyl from the reaction mixture.

8. The process of preparing an o-perfluoroalkane-amidobenzoylanthranyl which comprises reacting 2 moles of an o-aminobenzoic acid with the acyl halide of a perfluoroalkanoic acid in the presence of a basic, non-protonic solvent and at a temperature in the range of about 100–150° C., and recovering the desired o-perfluoro-alkaneamidobenzoyl anthranyl from the reaction mixture.

References Cited
UNITED STATES PATENTS 2,633,466   3/1963   Wallingford _____ 260—244

WALTER A. MODANCE, *Primary Examiner.*

WILLIAM H. SHORT, *Examiner.*

H. D. ANDERSON, R. T. BOND, *Assistant Examiners.*